(12) United States Patent
Witt

(10) Patent No.: US 6,427,138 B1
(45) Date of Patent: Jul. 30, 2002

(54) METHODS AND APPARATUS FOR PROVIDING AN ELECTRONIC PRICE LABEL COUNTDOWN TIMER

(75) Inventor: Cory A. Witt, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/506,036

(22) Filed: Feb. 17, 2000

(51) Int. Cl.⁷ .............................................. G06F 17/60
(52) U.S. Cl. .............................. 705/20; 705/16; 705/21
(58) Field of Search ................................. 705/14–20, 21; 340/825.35

(56) References Cited

U.S. PATENT DOCUMENTS

| | | | |
|---|---|---|---|
| 4,002,886 A | | 1/1977 | Sundelin |
| 5,172,314 A | * | 12/1992 | Poland et al. .................. 705/20 |
| 5,287,266 A | * | 2/1994 | Malec et al. ................... 705/20 |
| 5,711,160 A | * | 1/1998 | Namisniak et al. ............ 62/125 |
| 5,748,718 A | * | 5/1998 | Manicone .................... 379/131 |
| 5,771,005 A | | 6/1998 | Goodwin et al. |
| 5,873,069 A | | 2/1999 | Reuhi et al. |
| 5,880,449 A | | 3/1999 | Teicher et al. |
| 5,887,271 A | * | 3/1999 | Powell ......................... 705/14 |
| 5,907,143 A | | 5/1999 | Goodwin, III |
| 5,924,078 A | | 7/1999 | Naftzger |
| 5,933,813 A | | 8/1999 | Teicher et al. |
| 5,943,654 A | | 8/1999 | Goodwin, III et al. |
| 6,012,040 A | | 1/2000 | Goodwin, III |

FOREIGN PATENT DOCUMENTS

FR          2778775       * 11/1999

OTHER PUBLICATIONS

Drug Store News, May 30, 1994, p. 1, "Chains Tally Benefits of Scanning".*

Chain Store Age Executive with Shopping Center Age, v70, n8, p. 38, Aug. 1994, "Trying again, with less hype: electroni efforts continue", Comark Merchandising, Inc. product announcement.*

* cited by examiner

Primary Examiner—Richard Chilcot
(74) Attorney, Agent, or Firm—Priest & Goldstein, PLLC

(57) ABSTRACT

Techniques for informing customers of impending price changes of items in a retail establishment are described. An EPL computer reads an EPL data file to determine when an upcoming price change for an item is scheduled to occur. The EPL computer transmits a timer countdown message to a EPL associated with the item which includes a time remaining until a current price is to be updated with a new price. The EPL then displays the time remaining for the current price, providing valuable information to customers who are in the process of making purchasing decisions. In one aspect, as time passes, the EPL computer sends further timer countdown messages to the EPL containing updates of the time remaining, allow the EPL to display the updated time. In another aspect, no further timer countdown messages are sent to the EPL, as the EPL includes EPL circuitry which decrements and updates the time remaining as time passes.

12 Claims, 7 Drawing Sheets

METHODS AND APPARATUS FOR PROVIDING AN ELECTRONIC PRICE LABEL COUNTDOWN TIMER

FIELD OF THE INVENTION

The present invention relates generally to improvements in electronic price label (EPL) systems used in transaction establishments. More specifically, the present invention relates to improvements in EPL systems including systems and methods for an EPL to display the time remaining before a price change for an item is scheduled to occur.

BACKGROUND OF THE INVENTION

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server where information about the EPLs is typically maintained in an EPL data file. The EPL data file contains EPL identification information and EPL merchandise item information. The central server sends messages, including price change messages, to the EPLs.

It can be envisioned that occasionally a customer may pick up an item from the store shelf, and as the customer continues to shop, the product price changes before the customer gets to the register to purchase the item. Even if the price had decreased, this situation could cause the customer to believe that an incorrect price had been charged for the item. Where the price increased, customer confusion and anger might result.

Therefore, it would be desirable to provide an EPL system and method that can inform customers of price changes of items before the price changes occur.

SUMMARY OF THE INVENTION

The present invention advantageously provides methods and apparatus for informing customers of impending price changes of items in a retail establishment. According to one aspect of the present invention, an EPL computer reads an EPL data file to determine when an upcoming price change for an item is scheduled to occur. The EPL computer transmits a timer countdown message to a EPL associated with the item which includes a time remaining until a current price is to be updated with a new price. The EPL then displays the time remaining for the current price, providing valuable information to customers who are in the process of making purchasing decisions. In a presently preferred embodiment, as time passes, the EPL computer sends further timer countdown messages to the EPL containing updates of the time remaining, allow the EPL to display the updated time. According to another embodiment of the present invention, no further timer countdown messages are sent to the EPL, as the EPL includes EPL circuitry which decrements and updates the time remaining as time passes.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
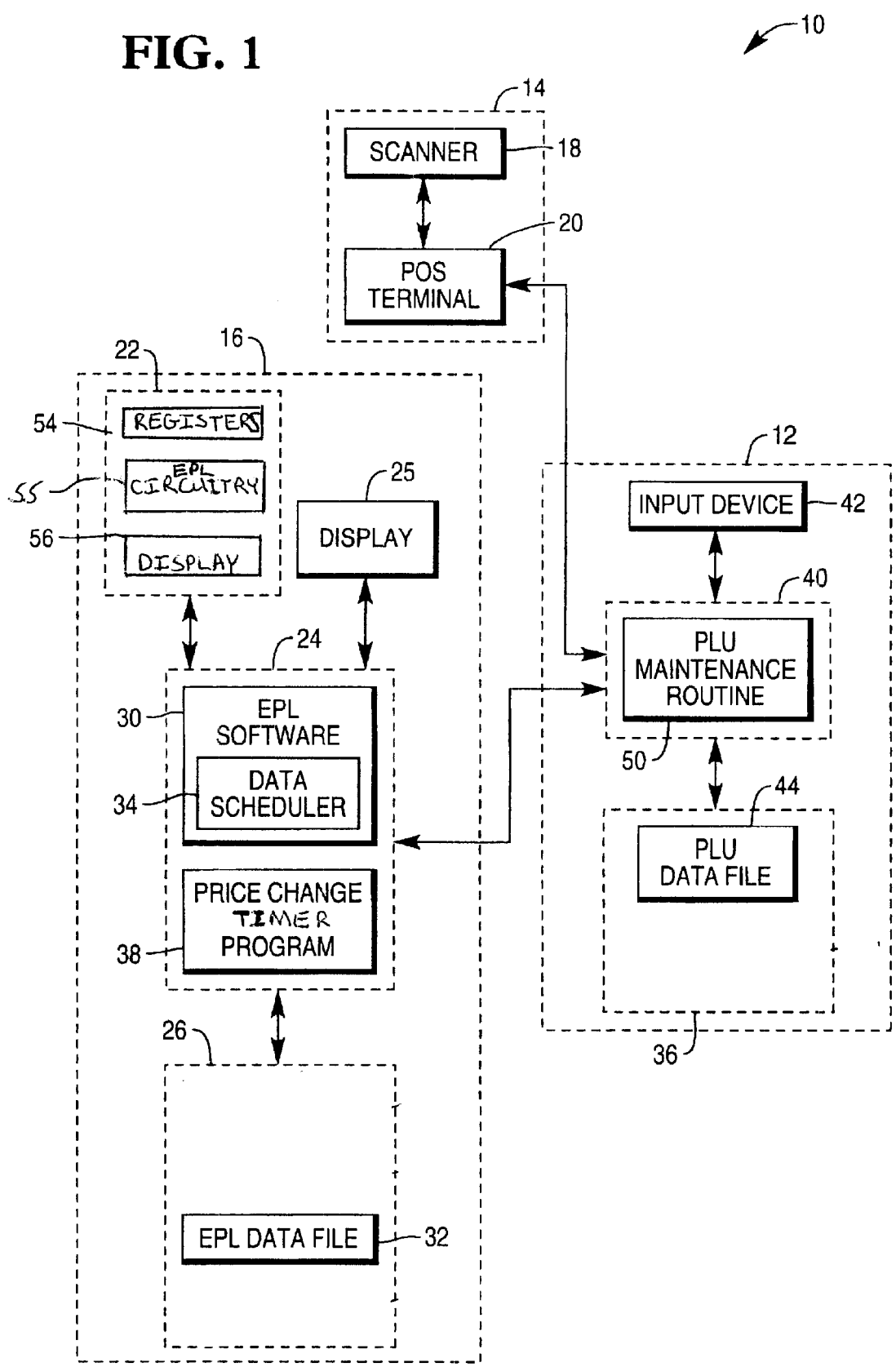
FIG. 1 shows a block diagram of a transaction management system, including an EPL system in accordance with the present invention.

FIG. 1 shows a transaction management system 10 which includes a host computer system 12, a point-of-service (POS) system 14, and an EPL system 16. Here, components 12, 14, and 16 are shown as separate components that are networked together, but they and their subcomponents may also be combined in various ways. Thus, host computer system 12 may be a POS terminal which doubles as a host computer for a network of other POS terminals.

The host computer system 12 includes a storage medium 36, a host price look-up (PLU) terminal 40, and an input device 42. The storage medium 36 includes a PLU data file 44 which stores item prices which are available for distribution to a POS terminal 20 by the host PLU terminal 40. Alternatively, provision may be made for a bar code scanner 18 to directly access the PLU data file 44 from the host PLU terminal 40. Host PLU terminal 40 executes PLU maintenance routine 50 which updates PLU data file 44. Input device 42 is preferably a keyboard.

POS system 14 includes bar code scanner 18 and terminal 20.

EPL system 16 primarily includes EPLs 22, host EPL terminal 24, EPL storage medium 26, and display 25.

Terminals 20, 24, and 40 are shown as separate components that are networked together, but they may also be combined in different ways. For example, EPL terminal 24 and host PLU terminal may be combined to form a single host computer. POS terminal 20 and host PLU terminal may be combined to form a POS terminal which doubles as a host computer for a network of other POS terminals.

EPLs 22 are typically attached to shelves within a store and include a data register 54, EPL circuitry 55 and a display 56. Data registers 54 contain data which usually includes the price of an item associated with an EPL on the shelves. Data registers 54 may also suitably include promotional or informational messages to be displayed. The data contained in registers 54 is typically displayed by display 56.

Host EPL terminal executes EPL software 30, which maintains the contents of EPL data file 32. Host EPL terminal 24 also executes price change timer countdown program 38, described in greater detail below.

EPL software 30 records, schedules, and transmits all messages to EPLs 22. EPL software 30 also maintains and uses EPL data file 32, which contains item information, such as a PLU number, scheduled price change time and EPL identification information for each of the EPLs 22. EPL software 30 includes data scheduler 34 which schedules EPL price change messages and EPL timer countdown messages to EPLs 22.

Figure 2:
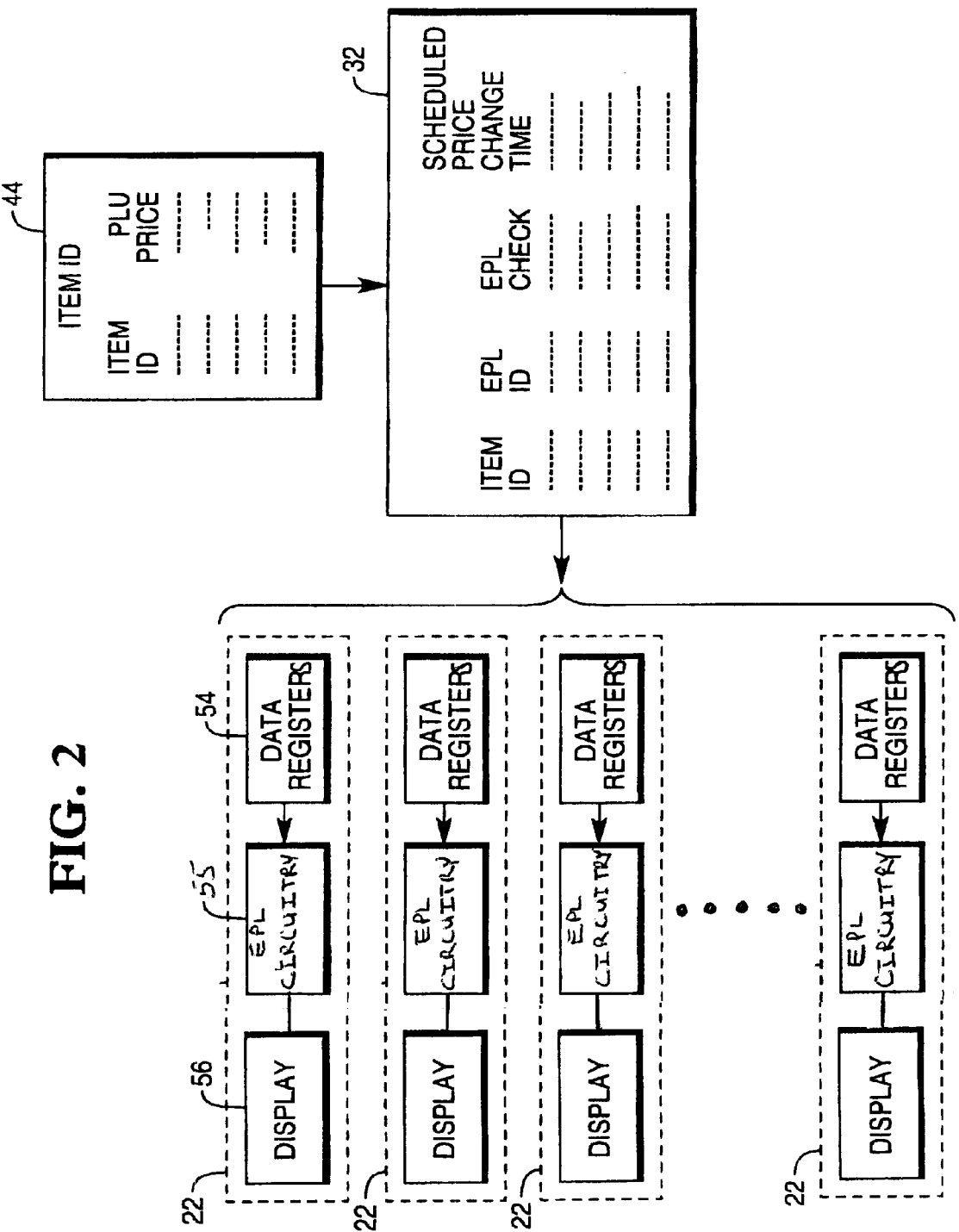
FIG. 2 shows a diagram of information within a PLU data file and an EPL data file in accordance with the present invention.

Turning now to FIG. 2A, EPL data file 32 and PLU data file 44 are shown in more detail. EPL data file 32 includes a line entry for each EPL 22 in EPL system 16. Each line entry has an item identification entry (ITEM ID), an EPL identification entry (EPL ID), and entry price checksum (EPL CHECK). Entry ITEM ID identifies a store item. Entry EPL ID identifies which EPL is assigned to the item. Entry price checksum (EPL CHECK) is calculated from the price in PLU data file 44.

While in a preferred embodiment EPL data file 32 also includes entry SCHEDULED PRICE CHANGE TIME for each EPL, scheduled price changes may also be maintained in a separate file.

PLU data file includes a line entry for each item sold in the store. Each line entry has an item identification entry (ITEM ID) identifying a store item, and a PLU price entry (PLU PRICE) identifying the price read by POS system 14 to determine the price of each item during scanning by bar code scanner 18.

During normal operation, EPL software 30 obtains price information for an item from PLU data file 44. Data scheduler 34 schedules price change messages for transmission. EPL software 30 controls transmission of messages to the EPL. The EPL stores the price data in register 54.

In order to ensure that a customer is aware of impending price changes, price change timer program 38 reads EPL data file 32 to determine which items have a SCHEDULED PRICE CHANGE TIME. If the SCHEDULED PRICE CHANGE TIME indicates that a price change will occur within a predetermined time period of the current time, for example, within an hour, the price change timer program 38 causes EPL software 30 to transmit a timer countdown message to the EPL 22 associated with the item whose price is to be changed. The timer countdown message instructs the EPL to display the time remaining for the current price. Further, the predetermined time may be advantageously selected to be a period of days or weeks to inform customers of the impending price change and allow the customers to plan purchases.

Figure 3A:
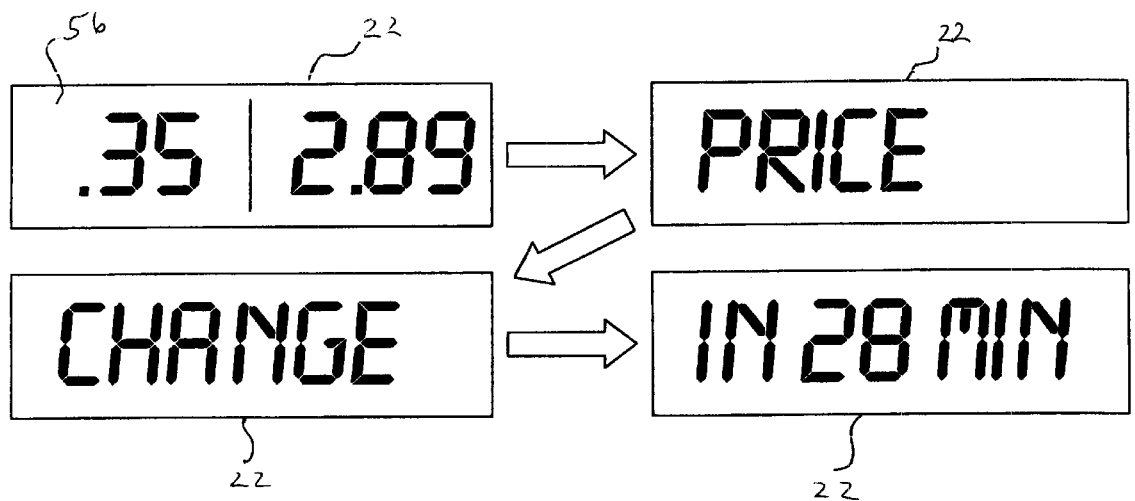
FIGS. 3A and 3B show an exemplary series of messages displayed by an EPL to inform a customer of an impending price change in accordance with the present invention.
Figure 3B:
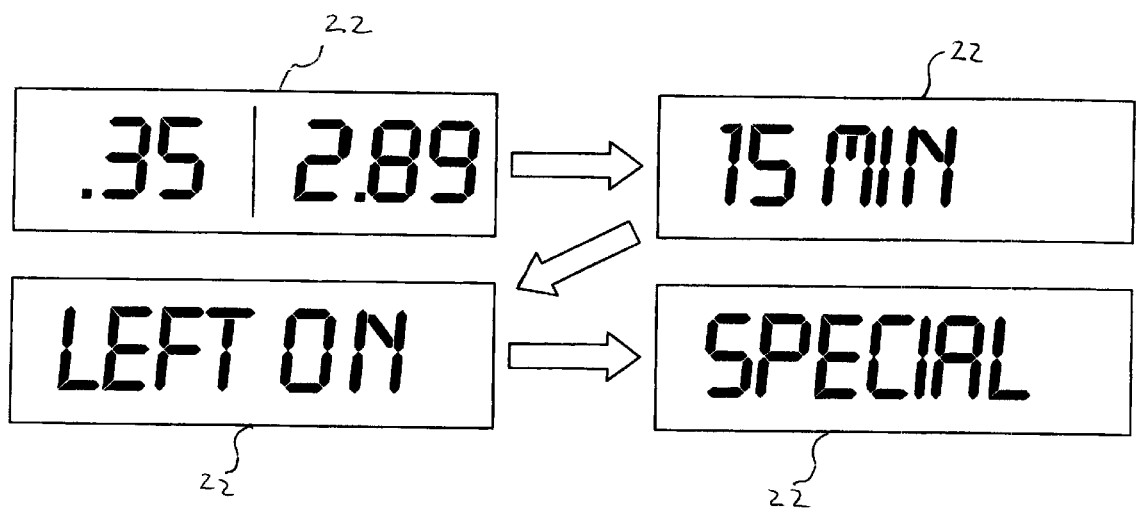

FIGS. 3A and 3B show an exemplary series of messages displayed by EPL 22 to inform a customer of an impending price change. A first message displayed by EPL 22 shows the customer the current unit price, such as price per ounce, and the current item price. In the examples shown in FIGS. 3A and 3B, "0.35" is the current unit price and "2.89" is the current item price. The EPL 22 may suitably scroll through a series of messages to inform the customer of the time remaining for the current price. In the example shown in FIG. 3A, the customer is informed that a price change will occur in 28 minutes. In the example shown in FIG. 3B, the customer is informed that 15 minutes remain on a special or sale price. By informing customers of the time remaining for items that are specially priced, a retail establishment may advantageously create an exciting atmosphere in the store as customers "hunt for the savings" in a treasure hunt type of promotion.

In a preferred embodiment, price change timer program 38 counts down the time remaining until the current price for an item is to be replaced with a new price and sends the EPL 22 a plurality of timer countdown messages, with each timer countdown messaged indicating the time remaining. A first timer countdown message sent to the EPL 22 may indicate that 60 minutes, for example, remains before a price change. Then, a minute later, a second timer countdown message sent to the EPL 22 would indicate that 59 minutes remains before the price change. In other words, the price change timer performs the countdown and informs the EPL 22 of the time remaining.

Figure 3C:
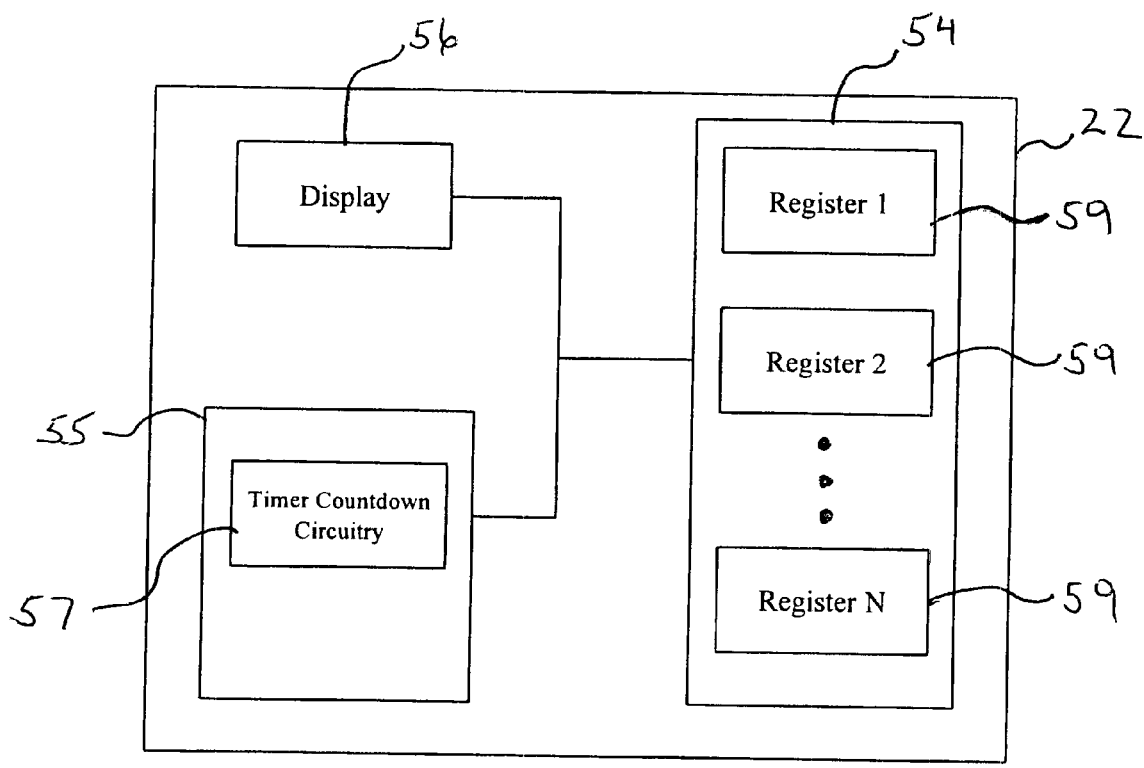
FIG. 3C shows a block diagram of an EPL in accordance with one aspect of the present invention.

In another embodiment, the price change timer program 38 sends a single countdown message to the EPL 22 and the EPL circuitry 55 performs the countdown, updating the EPL display 56 as time passes. As shown in FIG. 3C, the EPL circuitry 55 includes timer countdown circuitry 57 which decrements the time remaining. The time remaining is stored in one of a plurality of registers 59. In addition to storing the time remaining, the registers 59 may suitably store promotional or other types of information to be displayed by the EPL 22.

Figure 4:
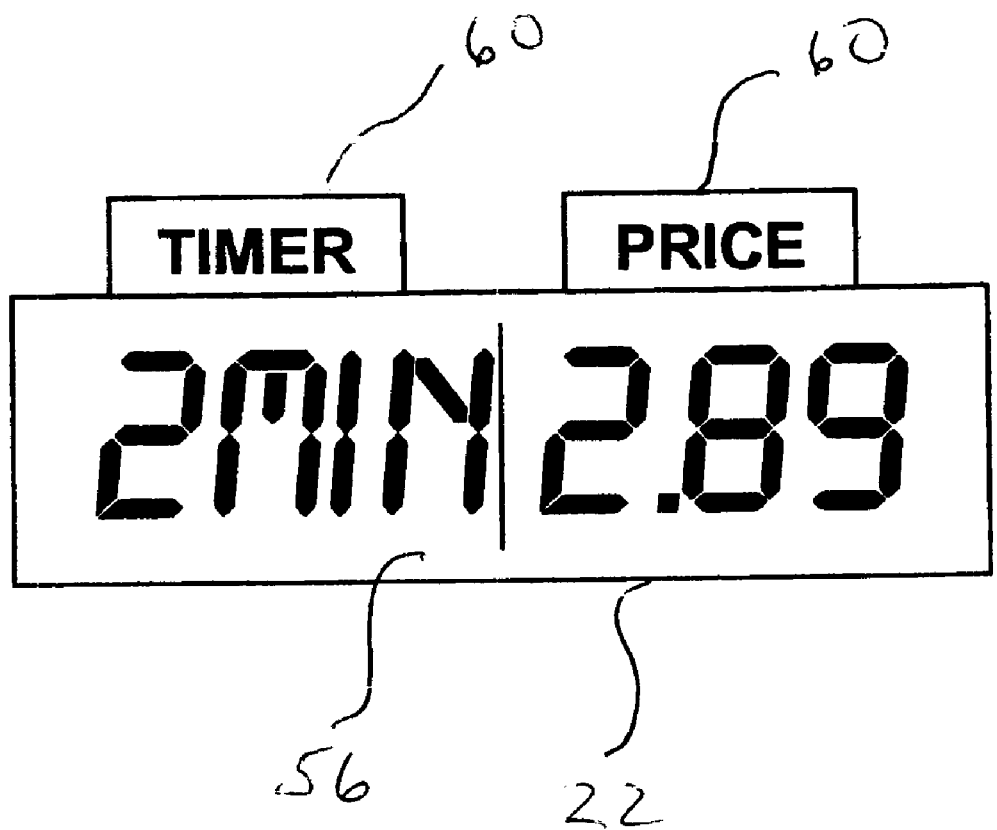
FIG. 4 shows an exemplary EPL display showing a current price of an item and a time remaining for the current price in accordance with the present invention.

FIG. 4 shows an alternate embodiment of the present invention in which the EPL display 56 shows both the current price and the time remaining for the current price. A paper or plastic overlay 60 may also be advantageously utilized to further describe the message displayed by EPL 22.

Figure 5:
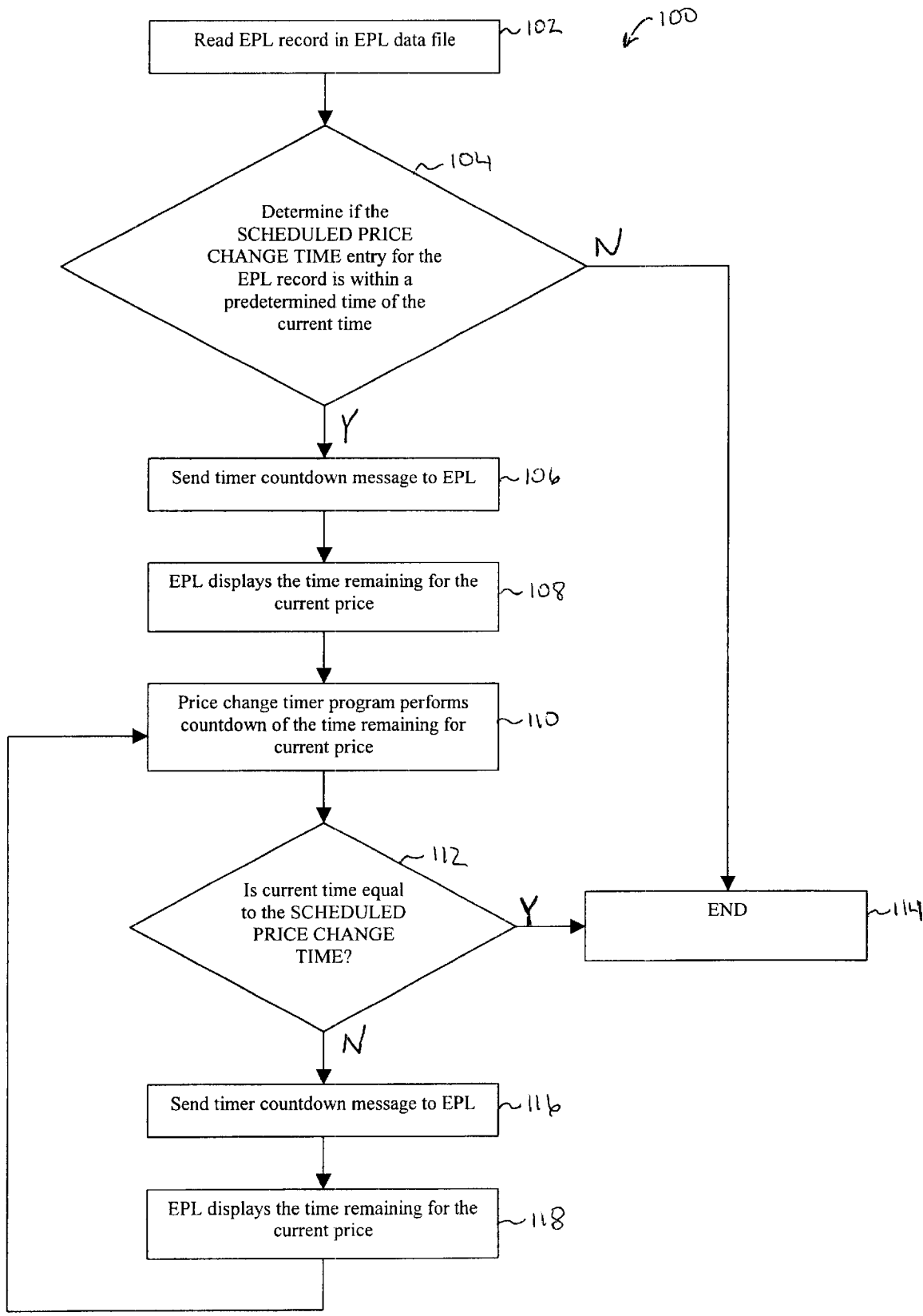
FIG. 5 shows a first method of informing a customer of an impending price change in accordance with the present invention.

FIG. 5 shows a method 100 of displaying a time remaining for a current price displayed by of an EPL according to a first embodiment of the present invention. In step 102, a price change timer program reads an EPL record in an EPL data file. In step 104, the price change timer program determines if a SCHEDULED PRICE CHANGE TIME entry in the EPL record is within a predetermined time of the current time. If the SCHEDULED PRICE CHANGE TIME entry is not within a predetermined time of the current time, the method proceeds to step 114 and ends. If the SCHEDULED PRICE CHANGE TIME entry is within the predetermined time of the current time, then the method moves to step 106 and the price change timer program sends a timer countdown message to the EPL. In step 108, the EPL displays the time remaining for the current price. In step 110, the price change timer program decrements the time remaining for the current price. Next, in step 112, the price change timer program determines if the current time is equal to the SCHEDULED PRICE CHANGE TIME. If the current time is equal to the SCHEDULED PRICE CHANGE TIME, the method continues to step 114 and ends. If the current time is not equal to the SCHEDULED PRICE CHANGE TIME, the method continues to step 116. In step 116, the price change timer program sends a timer countdown message to the EPL containing the current time remaining before the price change occurs. Next, in step 118, the EPL displays the current time remaining before the price change occurs and the method continues to step 110.

Figure 6:
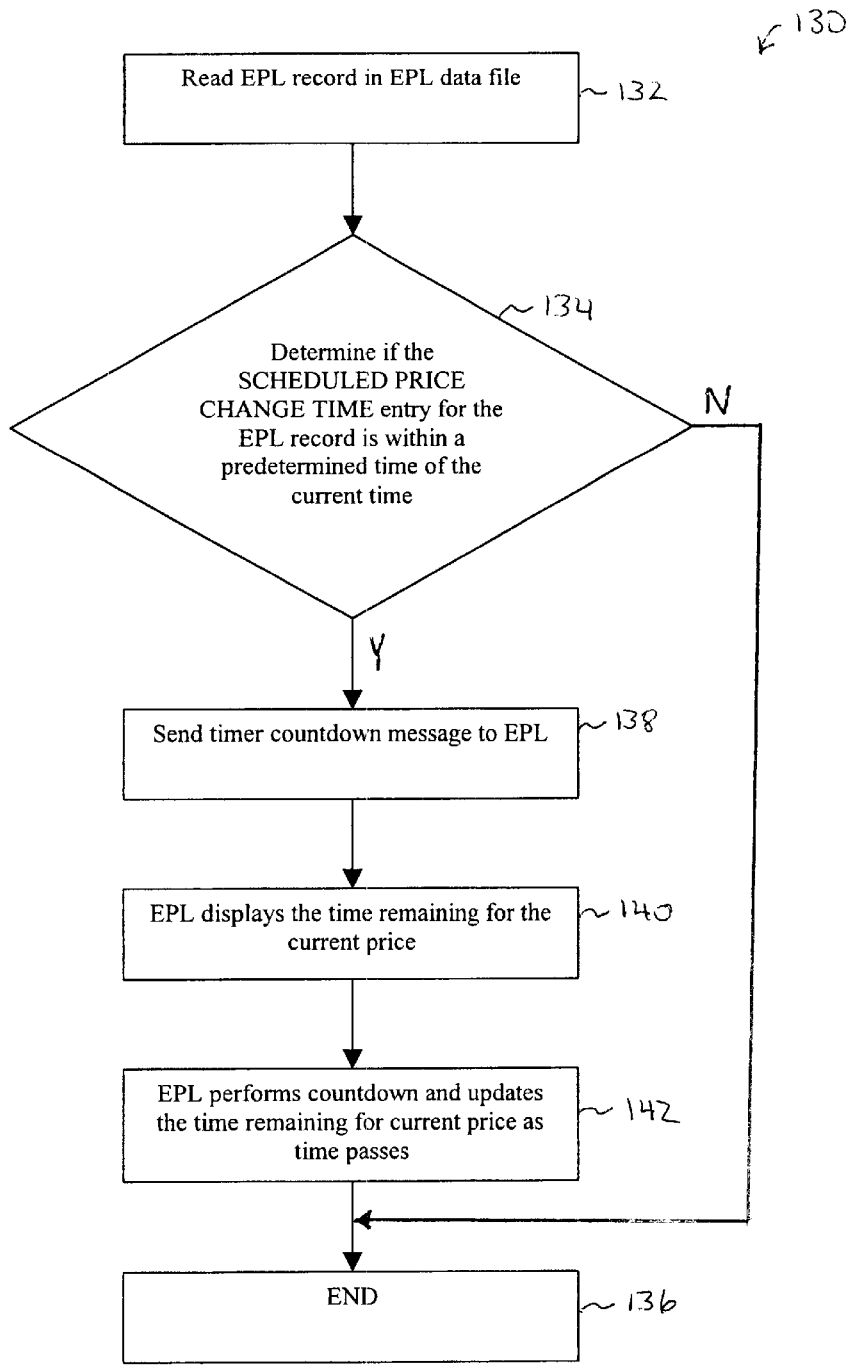
FIG. 6 shows a second method of informing a customer of an impending price change in accordance with the present invention.

FIG. 6 shows a method 130 of displaying a time remaining for a current price displayed by an EPL according to a second embodiment of the present invention. In step 132, a price change timer program reads an EPL record in an EPL data file. In step 134, the price change timer program determines if a SCHEDULED PRICE CHANGE TIME entry is within a predetermined time of the current time. If the SCHEDULED PRICE CHANGE TIME entry is not within a predetermined time of the current time, the method moves to step 136 and ends. If the SCHEDULED PRICE CHANGE TIME entry is within the predetermined time of the current time, then the method moves to step 138 and the price change timer program sends a timer countdown message to the EPL. In step 140, the EPL displays the time remaining for the current price. In step 142, the EPL performs a countdown of the time remaining and displays the time remaining as time passes. When no time remains for the current price, the method moves to step 136 and ends.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

I claim:

1. An electronic price label (EPL) system comprising:

an EPL for displaying a current price of an item and displaying a time remaining until the current price is replaced with a new price; and an EPL computer which sends timer countdown message to the EPL, said timer countdown message including the time remaining until the current price of the item is replaced with the new price.

2. The EPL system of claim 1 wherein:

the EPL computer sends a second timer countdown message to the EPL, said second timer countdown message including a second time remaining until the current price of the item is replaced with the new price.

3. The EPL system of claim 1 wherein:

the EPL updates the time remaining until the current price is replaced with the new price.

4. The EPL system of claim 1 wherein:

the EPL displays the time remaining as a series of scrolling messages.

5. The EPL system of claim 1 wherein:

the EPL is located on a store shelf in a location adjacent to the item.

6. The EPL system of claim 1 wherein:

the EPL comprises a data register, a display and EPL circuitry.

7. The EPL system of claim 1 further comprising:

a price look-up (PLU) file which contains a plurality of prices corresponding to a plurality of items; and a bar code scanner adapted to access the PLU file.

8. A method of informing a customer that a first price displayed by an electronic price label (EPL) will be replaced with a second price comprising the steps of:

reading a record associated with an EPL to determine a price change time;

if the price change time is within a predetermined time period of a current time, sending a timer countdown message to the EPL, the timer countdown message including a time remaining until the first price is replaced by the second price; and displaying by the EPL the time remaining.

9. The method of claim 8 further comprising the steps of:

decrementing by the EPL the time remaining; and displaying by the EPL the decremented time remaining.

10. The method of claim 8 further comprising the steps of:

sending a timer countdown message to the EPL, the timer countdown message including a decremented time remaining until the first price is replaced by the second price; and displaying by the EPL the decremented time remaining.

11. The method of claim 8 further comprising the steps of:

displaying by the EPL the time, remaining as a series of scrolling messages.

12. The method of claim 8 wherein:

the first price is a current price of an item; and the second price is a new price of the item.

* * * * *

UNITED STATES PATENT AND TRADEMARK OFFICE
CERTIFICATE OF CORRECTION

PATENT NO.    : 6,427,138 B1
DATED         : July 30, 2002
INVENTOR(S)   : Witt, C. A.

It is certified that error appears in the above-identified patent and that said Letters Patent is hereby corrected as shown below:

Column 5,
Line 20, delete "which sends" and insert -- comprising an EPL data file which includes a scheduled price change time associated with the EPL, the EPL computer reading the EPL data file to determine when an upcoming price change for an item is scheduled to occur and, if the scheduled price change time is within a predetermined time period of the current time, sending a --.

Signed and Sealed this

Twelfth Day of November, 2002

*Attest:*

*Attesting Officer*

JAMES E. ROGAN
*Director of the United States Patent and Trademark Office*